(12) United States Patent
Lev et al.

(10) Patent No.: US 7,711,909 B1
(45) Date of Patent: May 4, 2010

(54) READ SHARING USING GLOBAL CONFLICT INDICATION AND SEMI-TRANSPARENT READING IN A TRANSACTIONAL MEMORY SPACE

(75) Inventors: Yosef Lev, Cambridge, MA (US); Mark S. Moir, Hampton, NH (US)

(73) Assignee: Oracle America, Inc., Santa Clara, CA (US)

( * ) Notice: Subject to any disclaimer, the term of this patent is extended or adjusted under 35 U.S.C. 154(b) by 870 days.

(21) Appl. No.: 11/008,692

(22) Filed: Dec. 9, 2004

(51) Int. Cl.
*G06F 12/00* (2006.01)
*G06F 13/00* (2006.01)
*G06F 13/28* (2006.01)

(52) U.S. Cl. ............... 711/156; 711/100; 711/146; 711/111; 711/112; 711/113; 711/117; 711/118; 711/119; 711/141; 711/144; 711/145; 711/147; 711/148; 711/150; 711/151; 711/154; 711/167; 711/168

(58) Field of Classification Search ................. 711/156
See application file for complete search history.

(56) References Cited

U.S. PATENT DOCUMENTS

| | | | |
|---|---|---|---|
| 4,412,285 A * | 10/1983 | Neches et al. ............ | 709/252 |
| 4,584,640 A | 4/1986 | MacGregor et al. | |
| 4,847,754 A | 7/1989 | Obermarck et al. | |
| 5,224,215 A | 6/1993 | Disbrow | |
| 5,263,155 A * | 11/1993 | Wang ........................ | 707/8 |
| 5,319,778 A | 6/1994 | Catino | |
| 5,428,761 A * | 6/1995 | Herlihy et al. ............ | 711/130 |
| 5,699,516 A * | 12/1997 | Sapir et al. ............... | 710/110 |
| 5,864,851 A * | 1/1999 | Breitbart et al. .......... | 707/8 |
| 5,896,501 A * | 4/1999 | Ikeda et al. ............... | 709/216 |
| 6,128,710 A | 10/2000 | Greenspan et al. | |
| 6,144,965 A | 11/2000 | Olivier | |

(Continued)

FOREIGN PATENT DOCUMENTS

EP          0 366 585          5/1990

(Continued)

OTHER PUBLICATIONS

Transactional lock-free execution of lock-based programs pp. 5-17 Year of Publication: 2002 ISBN:1-58113-574-2 Ravi Rajwar; James R. Goodman.*

(Continued)

*Primary Examiner*—Tuan V Thai
*Assistant Examiner*—Marwan Ayash
(74) *Attorney, Agent, or Firm*—Robert C Kowert; Meyertons, Hood, Kivlin, Kowert & Goetzel, P.C.

(57) ABSTRACT

It has been discovered that globally indicating read-write conflicts and semi-transparent read sharing in a transactional memory space allows for a more expedient validation. Without being aware of particular transactions, a writing transaction can determine that a read-write conflict will occur with some transaction that has read one or more memory locations to be modified by the writing transaction. With semi-transparent reading, reading transactions can validate quickly. If a read-write conflict has not occurred since a reading transaction began (or since the last validation), then the previous reads are valid. Otherwise, the reading transaction investigates each memory location or ownership record to determine if a read-write conflict affected the investigating transaction.

51 Claims, 8 Drawing Sheets

U.S. PATENT DOCUMENTS

| | | | |
|---|---|---|---|
| 6,173,442 B1* | 1/2001 | Agesen et al. | 717/141 |
| 6,178,423 B1 | 1/2001 | Douceur et al. | |
| 6,360,219 B1 | 3/2002 | Bretl et al. | |
| 6,360,220 B1* | 3/2002 | Forin | 707/8 |
| 6,366,932 B1 | 4/2002 | Christenson | |
| 6,516,379 B1* | 2/2003 | Deshpande et al. | 710/310 |
| 6,581,063 B1 | 6/2003 | Kirkman | |
| 6,651,146 B1 | 11/2003 | Srinivas et al. | |
| 6,826,757 B2 | 11/2004 | Steele, Jr. et al. | |
| 2001/0047361 A1 | 11/2001 | Martin et al. | |
| 2003/0140085 A1 | 7/2003 | Moir et al. | |
| 2003/0174572 A1 | 9/2003 | Moir et al. | |
| 2003/0182462 A1 | 9/2003 | Moir et al. | |
| 2003/0182465 A1 | 9/2003 | Moir et al. | |
| 2004/0015510 A1 | 1/2004 | Moir et al. | |
| 2004/0015642 A1 | 1/2004 | Moir et al. | |
| 2004/0034673 A1 | 2/2004 | Moir et al. | |
| 2004/0153687 A1 | 8/2004 | Moir et al. | |
| 2005/0203904 A1* | 9/2005 | Mehaffy et al. | 707/8 |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 01/82057 | 11/2001 |
| WO | WO 03/060705 | 7/2003 |
| WO | WO 03/060715 | 7/2003 |

OTHER PUBLICATIONS

Luchangco et al. Jul. 2007; pp. 92-99; Software transactional memory for dynamic-sized data structures.*

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlefs et al.

U.S. Appl. No. 10/653,828, filed Sep. 3, 2003 and naming as inventor(s) Martin et al.

U.S. Appl. No. 10/669,948, filed Sep. 24, 2003 and naming as inventor(s) Dice et al.

U.S. Appl. No. 10/670,495, filed Sep. 24, 2003 and naming as inventor(s) Shavit et al.

U.S. Appl. No. 10/894,828, filed Jul. 20, 2004 and naming as inventor(s) Moir et al.

U.S. Appl. No. 10/894,829, filed Jul. 20, 2004 and naming as inventor(s) Moir et al.

U.S. Appl. No. 10/915,502, filed Aug. 10, 2004 and naming as inventor(s) Moir.

U.S. Appl. No. 10/966,465, filed Oct. 15, 2004 and naming as inventor(s) Moir et al.

U.S. Appl. No. 10/995,885, filed Nov. 23, 2004 and naming as inventor(s) Shavit et al.

Afek, Yehuda, "Atomic Snapshots of Shared Memory," Journal of the ACM, vol. 40, No. 4, pp. 873-890, 1993.

Agesen, Ole at el., "An Efficient Meta-Lock for Implementing Ubiquitous Synchronization," ACM SIGPLAN Notices, vol. 34, No. 10, pp. 207-222, Oct. 1999.

Anderson, James H. et al., "Universal Constructions for Large Objects," *IEEE Transactions on Parallel and Distributed Systems*, vol. 10, No. 12, pp. 1317-1332, 1999.

Attiya, Hagit et al., "An Adaptive Collect Algorithm with Applications," *Distributed Computing*, vol. 15, No. 2, pp. 87-96, Apr. 2002.

Goetz, Brian, "A First Look at JSR 166: Concurrency Utilities," Mar. 1, 2004. [URL: http://today.java.net/lpt/a/76].

Gottleib, Allan, et al., "Basic Techniques for the Efficient Coordination Of Very Large Numbers Of Cooperating Sequential Processors," *ACM Trans. Program. Lang. Syst.*, vol. 5, No. 2, pp. 164-189, Apr. 1983.

Goodman, James R., et al., "Efficient Synchronization Primitives for Large-Scale Cache-Coherent Multiprocessors," *Proceedings of the Third International Conference on Architectural Support for Programming Languages and Operating Systems*, pp. 64-75, ACM Press, New York, NY 1989.

Harris, T., et al., "Language Support for Lightweight Transactions," *Proc. 18th Annual ACM SIGPLAN Conf. on Object-Oriented Programming Systesm, Languages, and Applications*, pp. 388-402, ACM Press, New York, NY, 2003.

Hendler, Danny, et al., "A Scalable Lock-Free Stack Algorithm," *Proceedings of the 16th Annual ACM Symposium on Parallelism in Algorithms and Architectures*, pp. 206-215, ACM Press, New York, NY, 2004.

Herlihy, M., et al., "Transactional Memory: Architectural Support for Lock-Free Data Structures," *Proc. 20th International Symposium in Computer Architecture*, pp. 289-300, IEEE Computer Society, Washington, D.C., 1993.

Herlihy, Maurice, "Dynamic-Sized Lockfree Data Structures," Sun Microsystems Technical Report SMLI TR-2002-112, Jun. 2002.

Lamport, Leslie, "A Fast Mutual Exclusion Algorithm," *ACM Transactions on Computer Systems*, vol. 5, No. 1, pp. 1-11, 1987.

Luchangco, Victor et al., "Nonblocking k-compare-single-swap," *Proceedings of the 15th Annual ACM Symposium on Parallel Algorithms and Architectures*, pp. 314-323, ACM Press, New York, NY, 2003.

Mellor-Crummey, J., et al., Algorithms for Scalable Synchronization on Shared-Memory Multiprocessors, *ACM Transactions on Computer Systems*, vol. 9, No. 1, pp. 21-65, Feb. 1991.

Michael, Maged M. et al., "Non-Blocking Algorithms and Preemption Safe Locking on Multiprogrammed Shared Memory Multiprocessors," *Journal of Parallel and Distributed Computing*, vol. 51, No. 1, pp. 1-26, May 25, 1998.

Michael, Maged M. et al., "Safe Memory Reclamation for Dynamic Lock-Free Objects Using Atomic Reads and Writes," *Proceedings of the 21st Annual ACM Symposium on the Principles of Distributed Computing*, pp. 21-30, ACM Press, New York, NY, 2002.

Michael, M., "Scalable Lock-Free Dynamic Memory Allocation," *Proceedings of the ACM SIGPLAN 2004 Conference on Programming Language and Design and Implementation*, pp. 35-46, ACM Press, New York, NY, 2004.

Shavit, N., et al., "Software Transactional Memory," *Distributed Computing*, vol. 10, No. 2, pp. 99-116, Feb. 1997.

Herlihy, M.P., et al., "Linearizability: A Correctness Condition For Con-Current Objects," *ACM Transactions On Programming Languages and Systems*, 12(3):463-492, Jul. 1990.

Herlihy, M.P., "Wait-Free Synchronization," *ACM Transactions on Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.

Herlihy, M., "A Methodology For Implementing Highly Concurrent Data Objects," *ACM Transactions on Programming Languages and Systems*, 15(5):745-770, Nov. 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization and Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling for Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots In O(n log n) Operations," *SIAM Journal on Computing*, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Agesen, Ole, et al.; "DCAS-Based Concurrent Deques," *SPAA 2000. Proceedings of the 12th Annual ACM Symposium on Parallel Algorithms and Architectures*, pp. 137 146, ACM Press, New York, NY, ISBN: 1-58113-185-2, 2000.

Detlefs, David L. et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.

* cited by examiner

READ SHARING USING GLOBAL CONFLICT INDICATION AND SEMI-TRANSPARENT READING IN A TRANSACTIONAL MEMORY SPACE

BACKGROUND

The present invention relates to implementations of transactional memory. More specifically, the present invention relates to validating transactional operations in accordance with a global indication of read-write conflicts in a transactional memory space while supporting semi-transparent shared reading of the transactional memory space.

Current multi-processor architectures do not support synchronization primitives that can atomically access multiple memory locations. However, software transactional memory implementations have been proposed to provide atomic access to multiple memory locations in a multiple processor environment. Transactional memory may be implemented with software transactional memory or a hybrid of hardware and software transactional memory. Regardless of whether the transactional memory is implemented with software transactional memory or software transactional memory that uses hardware transactional memory support, current implementations do not allow concurrent transactions to read common memory locations without causing each other to abort if one of the transactions modifies one of the common memory locations.

Most software transactional memory algorithms utilize an ownership mechanism, which guarantees that a transaction "owns" a memory location in order to safely update it without conflicting with other transactions. While multiple transactions are typically prevented from accessing a memory location for write purposes to avoid corruption of data, multiple transactions are typically permitted to simultaneously read from the same location without aborting each other. Allowing multiple transactions to read a same location without aborting each other is referred to as read sharing. In addition to supporting read sharing, implementations should guarantee the atomicity of a transaction. Before a transaction can commit, it must determine that no other transaction has modified a location that it accesses; this is called "validation." In many cases, it is necessary to repeatedly validate a transactional read during execution of a transaction to avoid incorrect behavior as a result of observing inconsistent data.

There are two techniques typically employed that enable read sharing in current software transactional memory algorithms: 1) transparent reading and 2) non-transparent reading. These techniques typically employ structures, referred to as ownership records, to indicate ownership of memory locations represented with the ownership record. With "transparent reading," a transaction does not acquire ownership on a location before reading it but instead records identifiers of the ownership records that represent locations read by the transaction. In software transactional memory, implementations that use transparent reading (also known as "invisible reading"), a transaction which modifies a memory location is not aware of the currently executing transactions that have read or are reading this location. For a transaction to verify that previously read locations have not changed during execution of the transaction (i.e., validate the reading of the locations), the transaction rereads the ownership records. If the transaction has read locations represented by numerous ownership records, then the validation procedure of rereading all of the ownership records will be expensive. The validation procedure is utilized to avoid incorrect behavior like infinite loops and divide by zero, due to inconsistent read values.

With "non-transparent reading" (also known as "visible reading"), transactions that read locations do not iterate over the locations or representative ownership records to validate their read accesses. Instead, a transaction that modifies a location can determine the identity of each concurrent transaction that has read the location (e.g., with a linked list of references for the reader transactions) and explicitly aborts each of those transactions. Aborting all of the reader transactions is significantly expensive. In addition, maintaining and managing the list of reader transactions introduces complexity and is often expensive.

SUMMARY

It has been discovered that globally indicating read-write conflicts and semi-transparent read sharing in a transactional memory space allows for more expedient validation. Semi-transparent read sharing with global indication of read-write conflicts reduces validation time for transactions. Without being aware of particular transactions, a transaction can determine that a read-write conflict will occur with some transaction. The transactions that began execution prior to the modification are responsible for determining whether the write results in inconsistent data, and aborting themselves accordingly. Those transactions that reach a validation point without the occurrence of any read-write conflicts during their execution can validate quickly. If a read-write conflict occurs prior to a transaction reaching a validation point, then the transaction performs a validation operation that includes determining whether the write has polluted its particular readings. Hence, transactions are provided a quick avenue for validation without substantial overhead of tracking particular transactions that read locations.

These and other aspects of the described invention will be better described with reference to the Description of the Drawing(s) and accompanying Figures.

BRIEF DESCRIPTION OF THE DRAWING(S)

FIGS. 6A-6B depict implementations of semi-transparent reading with ownership records.

The use of the same reference symbols in different drawings indicates similar or identical items.

DESCRIPTION OF THE DRAWING(S)

The description that follows includes exemplary systems, methods, techniques, instruction sequences and computer program products that embody techniques of the present invention. However, it is understood that the described invention may be practiced without these specific details. For instance, particular procedures are described with reference to a compare-and-swap type operation, although other operations may be utilized to check consistency of one or more values atomically. Also, exemplary illustrations refer to an ownership record, although various structures and mechanisms can be employed to track reading transactions semi-transparently. In other instances, well-known protocols, structures and techniques have not been shown in detail in order not to obscure the invention.

Figure 1:
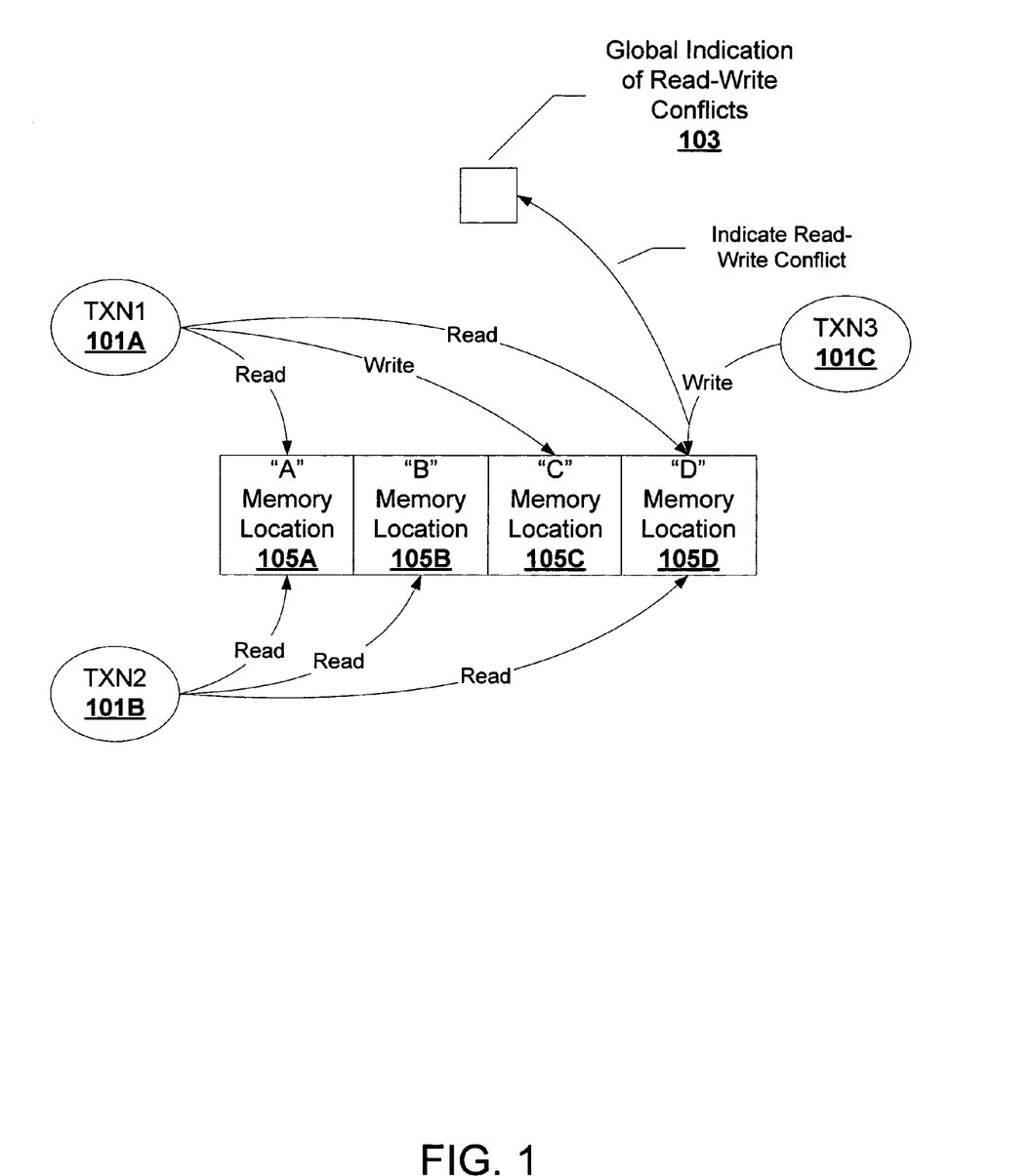
FIG. 1 is an exemplary diagram that depicts semi-transparent read sharing of memory locations in an environment with concurrently executing transactions.

A transaction is a collection of operations to be executed atomically. Semi-transparent read sharing facilitates a reduced validation process and minimal overhead. In semi-transparent read sharing, a modifying transaction is aware that there are some active reading transactions that have read or are currently reading from the location to be modified, but the modifier transaction is not aware of the exact identities of the active reading transactions. Knowledge that some active reading transactions has read or is reading the location to be modified is sufficient for the modifier transaction to correctly predict that the modification will cause a read-write conflict. The modifier transaction globally indicates that the read-write conflict has occurred or will occur. Hence, the modifier transaction is able to notify all active transaction that a read-write conflict has occurred that may corrupt their data, without being aware of their particular identities and without the accompanying complexity of maintaining their particular identities. Moreover, the modifier transaction is not responsible for aborting all of the transactions affected by the modification. Instead, those reading transactions that determine they are affected by the read-write conflicts are responsible for aborting themselves to avoid using inconsistent data. With the global indication of a read-write conflict, transactions are able to quickly validate their reads if a read-write conflict has not occurred during execution of the transaction. Otherwise, the transactions expend resources iterating over all of the locations or representations of locations read by the transaction. Hence, the cost of validating in an environment with multiple concurrently executing transactions is significantly reduced with the quicker validation as well as reduced complexity with management of less information FIG. 1 is an exemplary diagram that depicts semi-transparent read sharing of memory locations in an environment with concurrently executing transactions. Transactions 101A-101C access memory locations 105A-105D. The memory locations 105A-105D are respectively locations A-D. The transaction 101A (TXN1) reads memory locations 105A and 105D. The transaction 101A also writes to memory location 105C. The transaction 101B (TXN2) reads memory locations 105A, 105B, and 105D. The transaction 101C (TXN3) writes to the memory location 105C.

Figure 2:
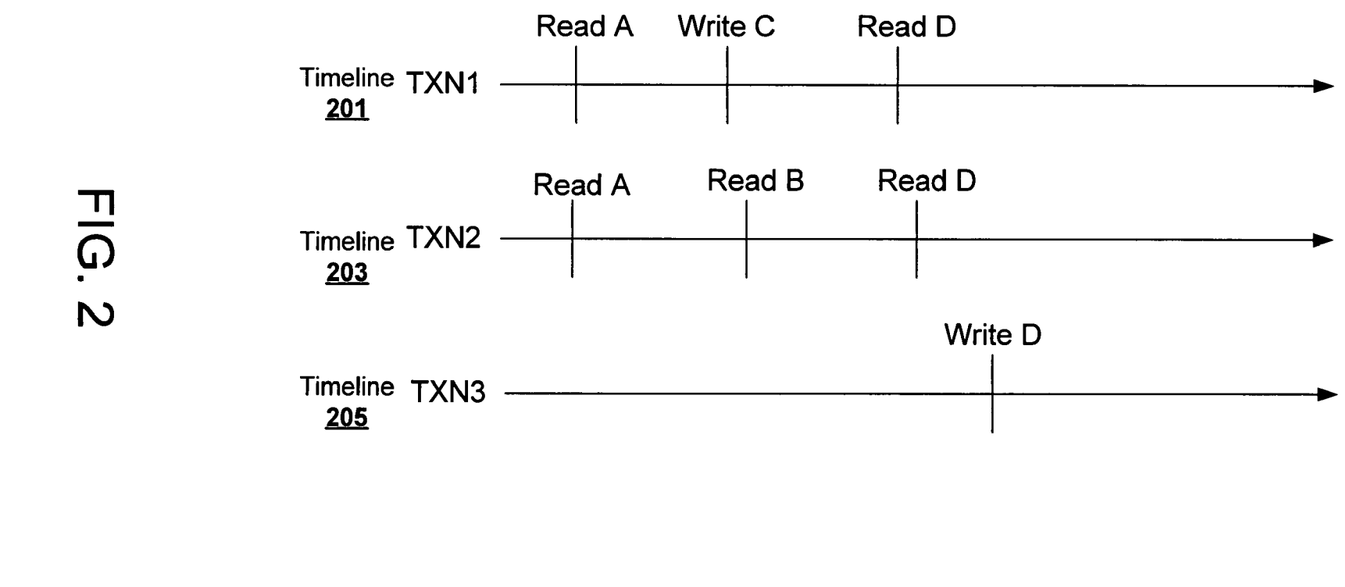
FIG. 2 depicts an exemplary timeline for the operations of the transactions of FIG. 1.

FIG. 2 depicts an exemplary timeline for the operations of the transactions of FIG. 1. Timelines 201, 203, and 205 respectively indicate occurrence of operations for the transactions 101A-101C. According to the exemplary timelines, transactions 101A and 101B read memory location 105A concurrently. The transaction 101A writes to the memory location 105C while the transaction 101B reads memory location B. The transactions 105A and 105B then concurrently read from memory location 105D. Subsequent to the transactions 101A-101B reading the memory location 105D, the transaction 101C writes to the memory location 105D.

Referring to FIG. 1, transaction 101C updates a global indication of read-write conflicts 105 to indicate the read-write conflict with transactions 101A and 101B caused by the modification to the memory location 105D. Since none of the transactions read the memory location 105C, the transaction 101A has no read-write conflicts to indicate.

Figure 3:
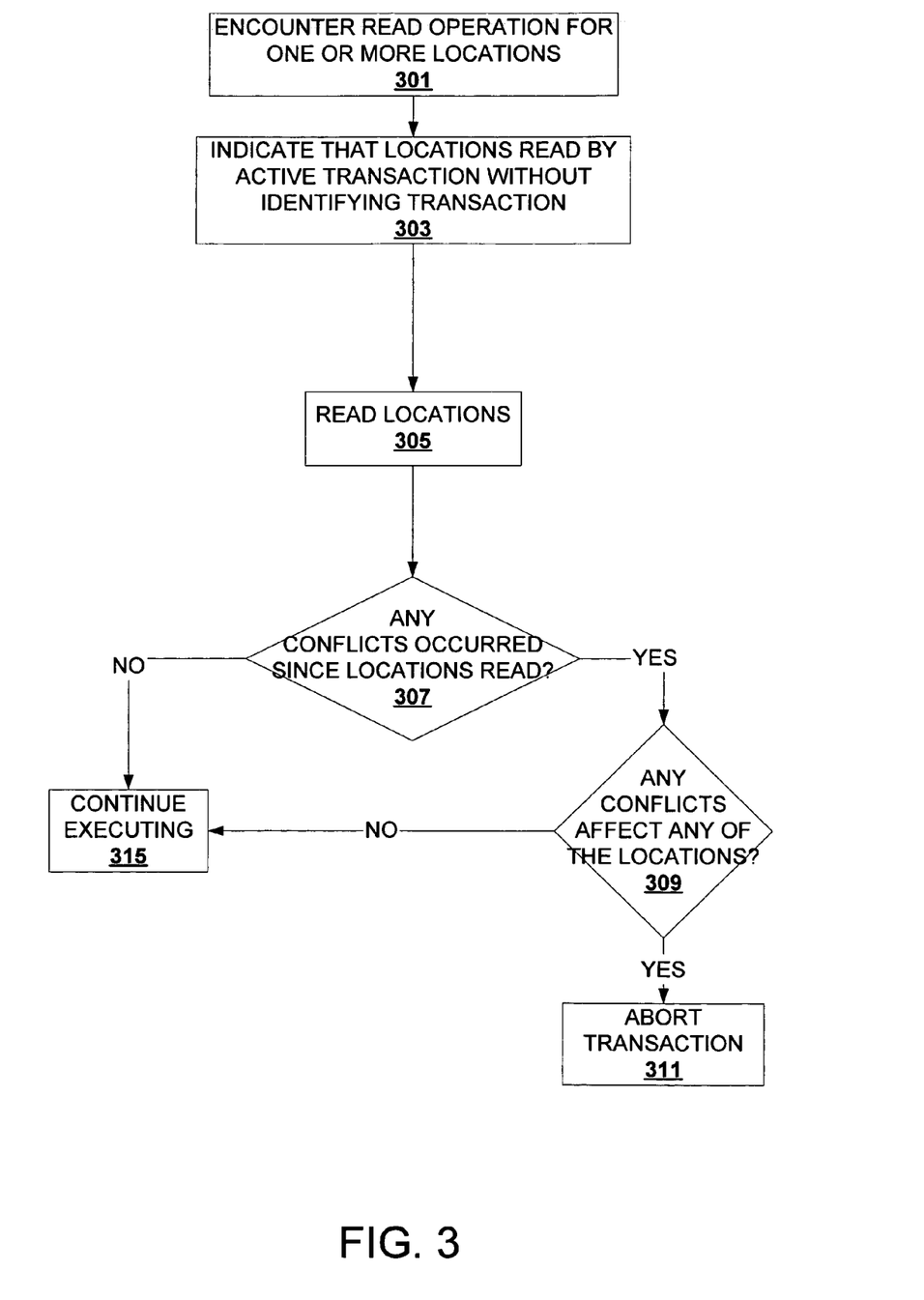
FIG. 3 depicts an exemplary flowchart for a transaction reading and validating.

FIG. 3 depicts an exemplary flowchart for a transaction reading and validating. At block 301, a read operation is encountered for one or more locations by an active transaction. At block 303, the active transaction indicates that the locations are being read without identifying itself. For example, transaction 101A updates a flag or increments a counter for the memory location 105A, perhaps stored in the memory location 105A. If memory locations 105A and 105D are collectively represented with a structure, then the transaction increments a counter for the structure. At block 305, the active transaction reads the locations. A validation process begins at block 307. Although not illustrated, a number of operations may occur between blocks 305 and 307 (e.g., reading and/or writing to other memory locations, performing calculations, etc.). At block 307, it is determined, by checking a global indication of read-write conflicts, whether any read-write conflicts have occurred since the locations were read by the active transaction. If conflicts have occurred, then control flows to block 309. If no conflicts have occurred, then control flows to block 315.

At block 315, the active transaction continues to execute, or perhaps commits. Since there have been no occurrences of read-write conflicts, a transaction can be confident that locations read by the active transaction have not been modified. For example, if transaction 101B begins validating prior to the write performed by the transaction 101C, then the transaction 101B will quickly validate since there have been no read-write conflicts.

At block 309, it is determined if any of the read-write conflicts that have occurred affect the validating transaction. If the validating transaction is not affected by the read-write conflicts, then control flows to block 315. If the validating transaction is affected by the read-write conflicts that have occurred, then control flows to block 311. At block 311, the validating transaction aborts itself. For example, if the transaction 101B begins validation after the write by transaction 101C, the transaction 101B iterates over memory locations 105A, 105B, and 105D (assuming they are not collectively represented). When the transaction 101B inspects the memory location 105D (or its representation), then the transaction 101B will discover that the transaction 101C has write ownership and has or will modify the memory location 105D. Hence, the previous read of the memory location 105D by the transaction 101C is stale or corrupt.

Figure 4:
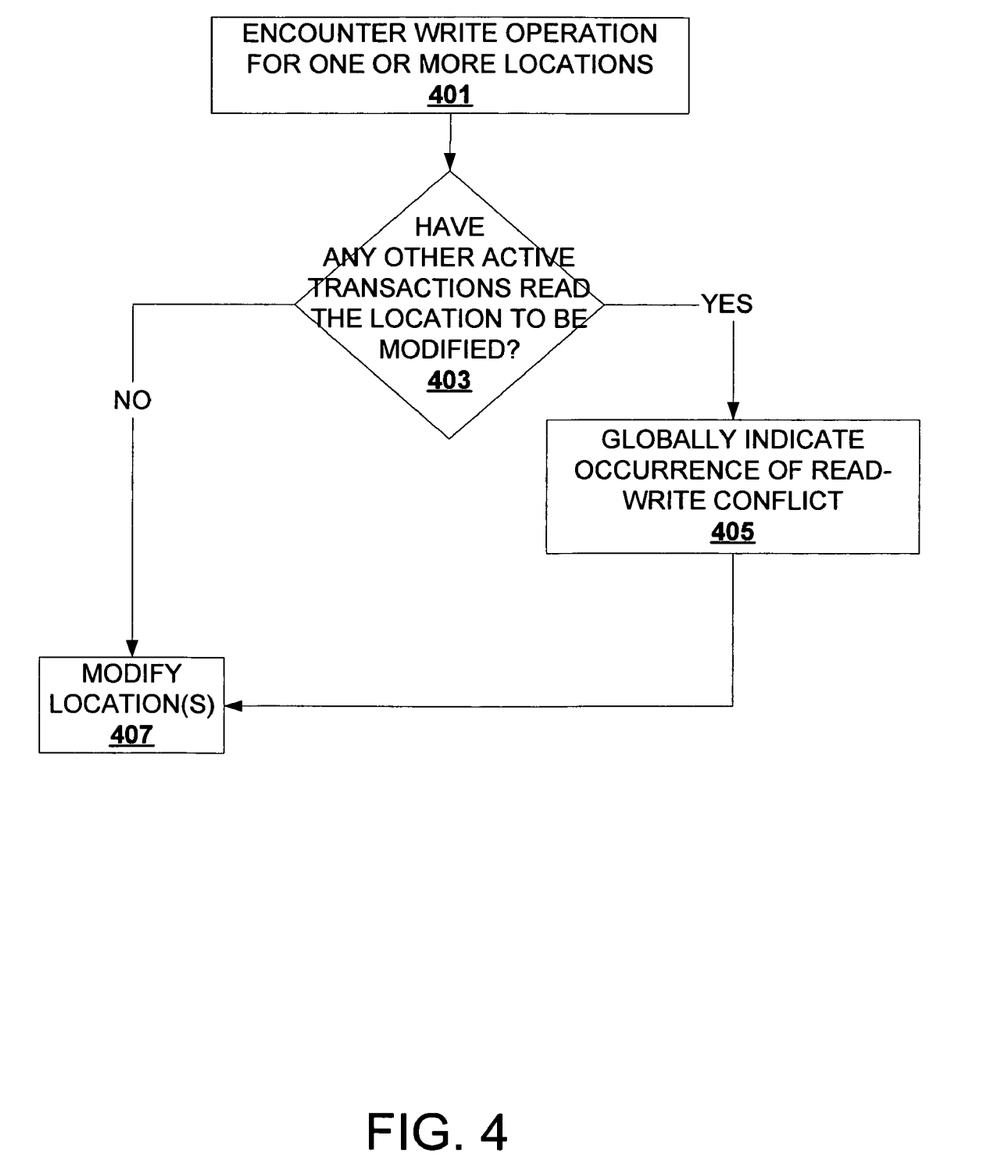
FIG. 4 depicts a flowchart for a transaction to indicate a read-write conflict if appropriate.

FIG. 4 depicts a flowchart for a transaction to indicate a read-write conflict if appropriate. At block 401, a transaction encounters a write operation for one or more locations. At block 403, it is determined if any other active transactions have read the location to be modified. If the modifying transaction determines that other transactions have read the location to be modified, then control flows to block 405. If the modifying transaction determines that no other transactions have read the location to be modified, then control flows to block 407.

At block 405, the modifying transaction globally indicates occurrence of a read-write conflict. Control flows from block 405 to block 407.

At block 407, the transaction modifies the one or more locations.

Referring to FIG. 1, the transaction 101A writes to the memory location 105C without updating the global indication of read-write conflicts 103. The transaction 101C, however, determines that some transactions have read the memory location 105D, although the transaction 101C is not aware which transactions have read the memory location 105D.

Therefore, the transaction 101C updates the global read-write conflicts indication 103 to indicate occurrence of a read-write conflict.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.).

Although the indications of write ownership and indications that some transactions have read a memory location may be embedded within the memory location being read or modified, implementations may utilize representative structures. For example, ownership records may be associated with one or more memory locations. Write ownership is acquired over the ownership record, and hence the locations associated with the ownership record. In addition, the indication of reading transactions may be incorporated into ownership records.

Figure 5:
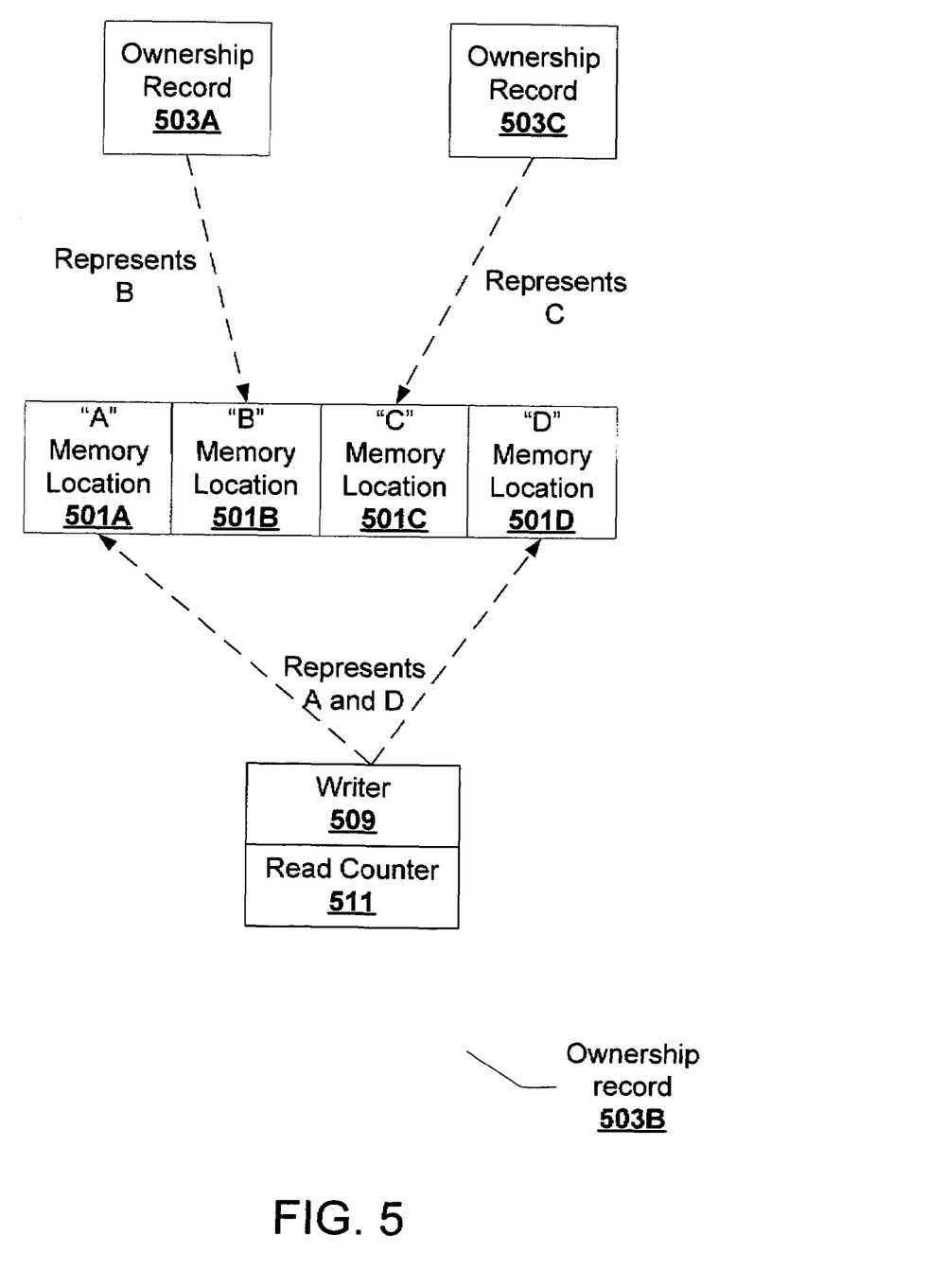
FIG. 5 depicts an exemplary ownership record.

FIG. 5 depicts an exemplary ownership record. A memory location 501B is represented by an ownership record 503A. A memory location 501C is represented by an ownership record 503C. An ownership record 503B represents memory locations 501A and 501D. Exemplary details of the ownership record 503B are depicted. Details of the ownership records 503A and 503C are not depicted, but are similar to the ownership record 503B, if not the same. The ownership record 503B is depicted as including a writer field 509, and a read-counter field 511. The writer field 509 indicates a transaction that most recently held or currently holds write ownership over the ownership record. The transaction may write to any one or more of the memory locations represented by the ownership record. The read-counter 511 indicates a number of transactions that have read at least one of the memory locations represented by the ownership record 503B. Whether a transaction reads A, D, or both A and D, the transaction will increment the read-counter 511. To access an ownership record, a transaction utilizes the address of the location to be modified. For example, a transaction applies a hash function to the target address of a write operation. The hash of the address is used to locate the corresponding ownership record. In another example, the ownership records are collectively maintained as a data structure with each entry incorporating an identifier for the particular record. The ownership record depicted in FIG. 5 is meant to aid in understanding the invention and not meant to be limiting upon the invention. Implementations may utilize other structures or mechanisms for semi-transparent reading. For example, FIG. 5 depicts an array, although a hash table may be implemented with each entry keyed off a hash of the represented memory location(s). In addition, instead of a writer identifier, an ownership record may indicate a time value. Furthermore, the functionality for maintaining an ownership record may be modularized in any of a variety of ways. For example, separate processes may be responsible for maintaining each of the fields of the ownership record.

Figure 6A:
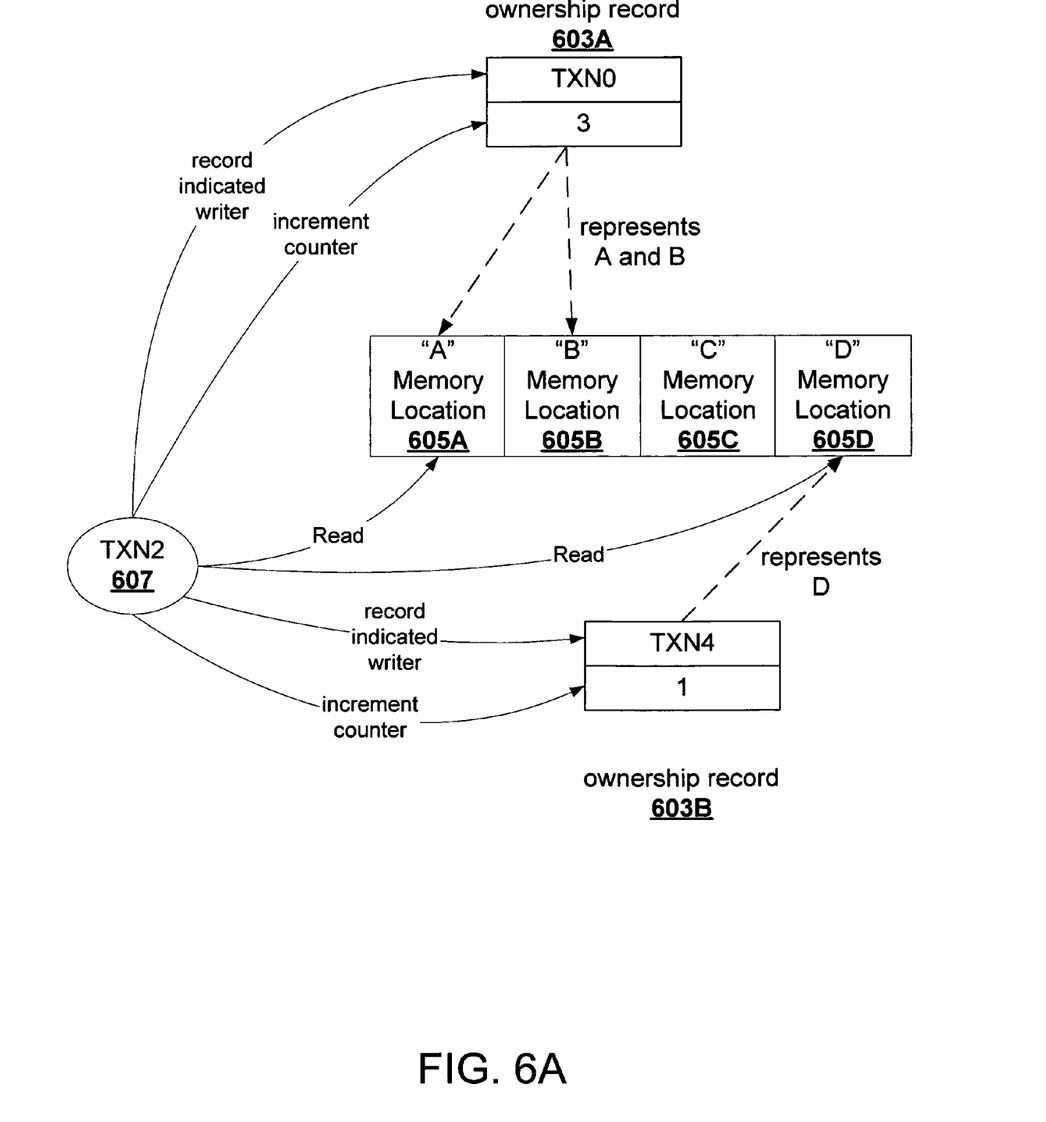
FIG. 6A is an exemplary depiction of a transaction semi-transparently reading a location and updating an ownership record.
Figure 6B:
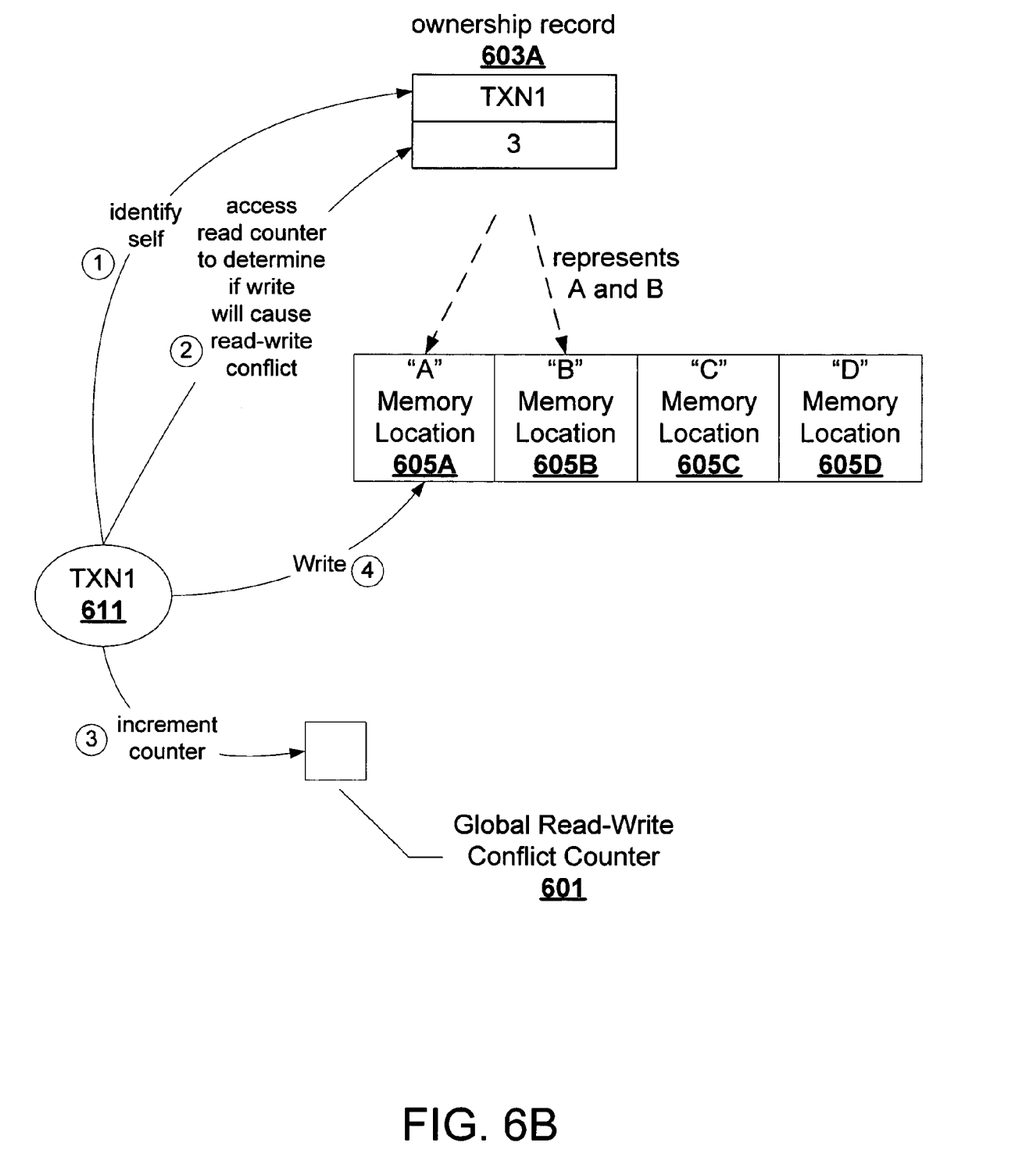
FIG. 6B is an exemplary depiction of a transaction utilizing semi-transparent reading with an ownership record to avoid aborting transactions.

FIGS. 6A-6B depict implementations of semi-transparent reading with ownership records. FIG. 6A is an exemplary depiction of a transaction semi-transparently reading a location and updating an ownership record. A transaction 607 (TXN2) reads memory locations 605A and 605D. The memory locations 605A and 605D are respectively represented by ownership records 603A and 603B. Prior to reading the memory location 605A, the transaction 607 records the identity of the previous writer (TXN0) and increments the read-counter in the ownership record 603A from 2 to 3. Although the example describes recording a writer identifier, other techniques may be utilized, such as recording a previously written timestamp. Instead of recording the writer field, the transaction may keep a snapshot of the ownership record right after the read-counter update. The ownership record 603A now indicates that three transactions have read or are reading at least one of the memory locations represented by the ownership record 603A. Likewise, prior to reading the memory location 605D, the transaction 607 records the identity of the previous writer and increments the read-counter in the ownership record 603B from 0 to 1. At this point, the transaction 607 is the only transaction reading the memory location 605D. When the transaction 607 attempts to validate, if a read-write conflict has occurred, then the transaction 607 will read the current values in the writer fields of the ownership records 603A and 603B and compare them against the previously recorded values of the writer fields. If there has been any change, then the transaction 607 aborts. Otherwise, the transaction continues to execute or commits. Upon termination of the transaction 607 (i.e., whether the transaction 607 commits or aborts), the transaction 607 decrements the read-counter in the ownership records 603A and 603B. With the global read-write conflict counter, a transaction can validate all locations it has read by simply checking that the global read-write conflict counter has not changed since the transaction began. In the common case, the global read-write conflict counter will not have changed, so the overhead associated with rereading all of the memory locations or representations of the memory locations (the long validation procedure) can be avoided. If the counter has changed, this does not mean the transaction must abort, simply that it must use the long validation procedure. Furthermore, the transaction can use the new value of the global read-write conflict counter to allow future validation in the same transaction to quickly validate.

The following is example pseudo-code for a validate procedure.

Validate( )
{
   if (<Transactoin status>==Aborted)
   return false
   else {
   currentRWCounter=read global RWConflictsNum>;
   if   (<Transaction  snapshot  of RWConflictsNum>==currentRWCounter) return true
   else {
     <Transaction  snapshot  of RWConflictsNum>==currentRWCounter;
     bool readValid=VerifyReads( );
     if (!readValid)<Set transaction status to Aborted>;
     return readsValid;
   }
}

In the above code, a global read-write conflict indicator is implemented as the shared variable RWConflictsNum. As illustrated by the pseudo-code, the transaction re-reads the global read-write conflict indicator (unless its status is already aborted in which case it just returns false), and returns true if the value read is the same as its old snapshot of the counter. Otherwise, it saves the new value as its old snapshot of the counter, and validates the read using the long validation procedure, as described above. This technique guarantees that transactions do not need to do the long validation procedure if there were no read-write conflicts between the last time the transaction read the shared counter and the validation time. The exemplary code can simply return true in such cases because a transaction causing a validation process to fail must first change the shared RWConflictsNum counter value. Therefore, if the counter was not changed, the long read validation procedure can be safely skipped. The RWConflictsNum counter is subject to the ABA problem, and therefore it should be assured that it is of sufficient size. Also, bounded timestamps may be utilized to avoid the ABA problem.

FIG. 6B is an exemplary depiction of a transaction utilizing semi-transparent reading with an ownership record to avoid aborting transactions. At a time 1, a transaction 611 (TXN1) identifies itself in the ownership record 603A. For example, the transaction 611 writes a transaction identifier, a hash of a transaction identifier, etc., into the writer field of the ownership record 603A. Although examples have been described that write the identity of the writer into the ownership record, other techniques may be utilized to indicate modification of the memory location or acquisition of write ownership. For example, the writing transaction may write a timestamp into the field instead of a transaction identifier. At a time 2, the transaction 607 accesses the read-counter field of the ownership record to determine if the write operation will cause a read-write conflict. Since the read-counter indicates a 3, then a read-write conflict will be caused by the write operation. A non-zero read-counter indicates that a read-write conflict will occur, unless the writing transaction has incremented the read-counter to read the memory location as part of its own read operation (i.e., a read-counter of 1, indicates that the writing transaction is the only transaction that has read the memory location(s) to be modified). If the writing transaction has incremented the read-counter, then it ignores itself (no read-write conflict with itself) and does not update the global read-write conflict counter. Hence, at a time 3, the transaction 611 increments a global read-write conflict counter 601. At a time 4, the transaction 611 writes to the memory location 605A.

In the above description, a reading transaction is responsible for decrementing the read-counter when it terminates, and a writing transaction acquires write ownership for an ownership record by writing its identifier in the ownership record. In another technique, a writing transaction resets the read-counter when it acquires the write ownership as well as writing its identifier into the ownership record. A reading transaction, however, decrements the read-counter only if no writing transaction acquired ownership since the reading transaction incremented the read-counter. If multiple writing transactions acquire write ownership on the same ownership record, one after the other, then only the first writer increments the global read-write conflict counter. Only the first writing transaction will increment the global read-write conflict counter, because the read-counter remains zero until a new reading transaction increments the read-counter. Hence, the frequency of modifying a global conflict indicator is reduced.

Semi-transparent reading may consume extra overhead for conflicting write operations due to the compare-and-swap (CAS) operation employed when changing the shared RWConflictsNum counter. While this extra cost will probably be negligible compared to the benefit of the quick validate procedure in transactions that perform a relatively large number of reads, the extra cost might slow down short transactions that do not use the Validate function frequently. Note however, that the new technique can live together safely with the old transparent reads technique, as long as the two types of transactions do not share the same ownership records. Hence, in large systems, which use a software transactional memory mechanism for multiple types of data structures, semi-transparent reading may be employed for the data structures which might benefit from it. Furthermore, this overhead exists only if there is someone concurrently reading from the location being modified, and therefore usually there is also a benefit in that case.

With semi-transparent reading, a double benefit can be gained if a writing transaction waits some time before getting the write ownership on an ownership record, which has already been read or is being read by other transactions. Implementing the writing transaction to wait, not only might save the abortion (and therefore the retrying) of the conflicting reading transactions, but it might also prevent performance of some long validation procedures by non-conflicting reading transactions (since getting write ownership of an unowned ownership record does not change the global counter).

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Figure 7:
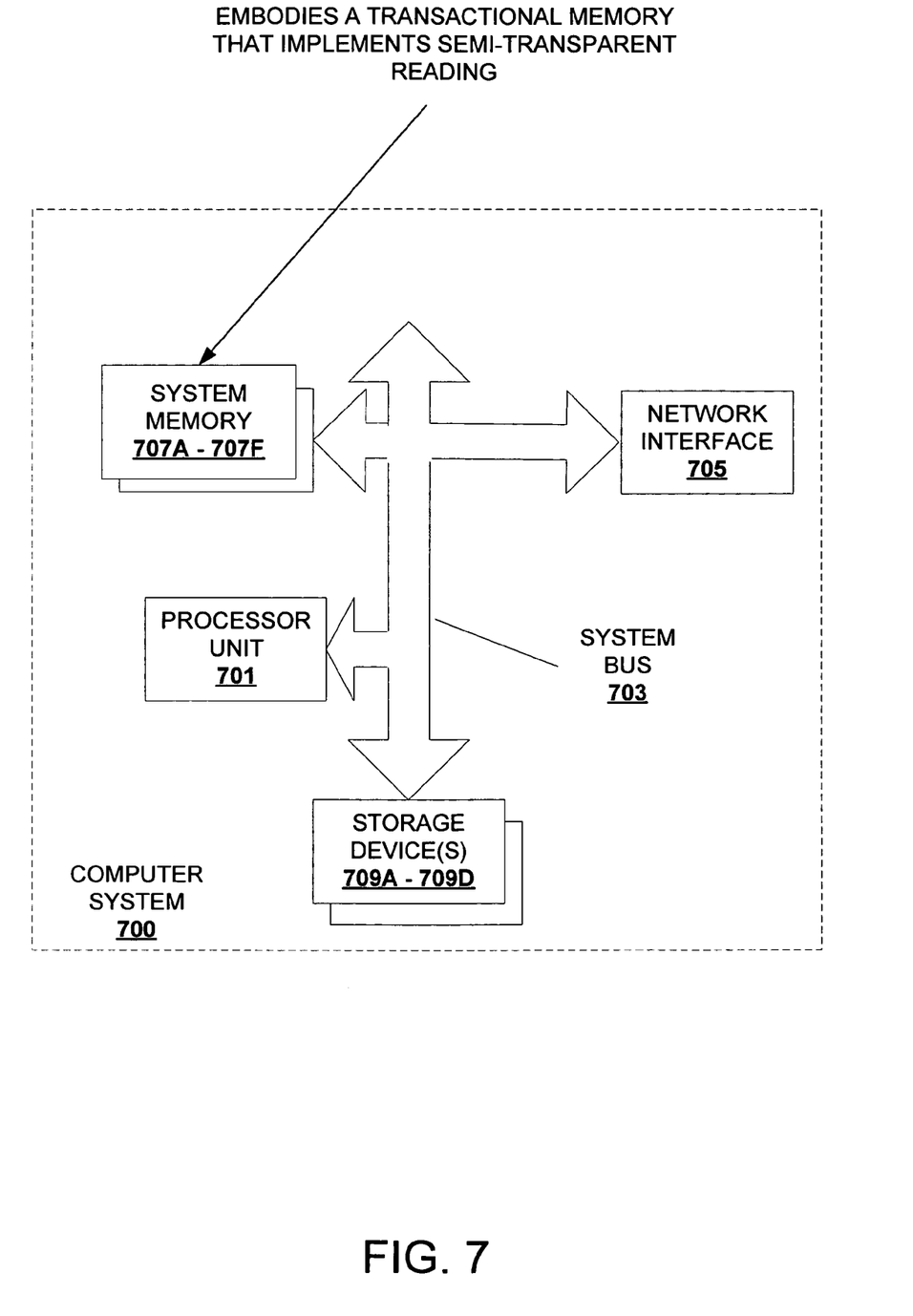
FIG. 7 depicts an exemplary computer system according to realizations of the invention.

FIG. 7 depicts an exemplary computer system according to realizations of the invention. A computer system 700 includes a processor unit 701 (possibly including multiple processors, a single threaded processor, a multi-threaded processor, a multi-core processor, etc.). The computer system 700 also includes a system memory 707A-707F (e.g., one or more of cache, SRAM DRAM, RDRAM, EDO RAM, DDR RAM, EEPROM, etc.), a system bus 703 (e.g., LDT, PCI, ISA, etc.), a network interface 705 (e.g., an ATM interface, an Ethernet interface, a Frame Relay interface, etc.), and a storage device (s) 709A-709D (e.g., optical storage, magnetic storage, etc.). Realizations of the invention may include fewer or additional components not illustrated in FIG. 7 (e.g., video cards, audio cards, additional network interfaces, peripheral devices, etc.). The processor unit 701, the storage device(s) 709A-709D, the network interface 705, and the system memory 707A-707F are coupled to the system bus 703. The system memory 707A-707F embodies a transactional memory that implements semi-transparent reading. The transaction memory may be implemented with hardware transactional memory, software transactional memory, or a hybrid of hardware and software transactional memory. An exemplary description of software transactional memory can be found in published U.S. patent application Ser. No. 10/621,072 entitled "SOFTWARE TRANSACTIONAL MEMORY FOR DYNAMICALLY SIZABLE SHARED DATA STRUCTURES," naming as inventors Mark S. Moir, Victor Luchangco, and Maurice Herlihy, filed on Jul. 16, 2003. An exemplary description of hybrid transactional memory can be found in published U.S. patent application Ser. No. 10/915,502 entitled "HYBRID HARDWARE/SOFTWARE TRANSACTIONAL MEMORY," naming as an inventor Mark S. Moir, filed on Aug. 10, 2004.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. Functionality may be separated or combined in blocks differently in various realizations of the invention or described with different terminology. These and other variations, modifications, additions, and improvements may fall within the scope of the invention as defined in the claims that follow.

What is claimed is:

1. A system, comprising:
   one or more processors; and
   a memory coupled to the one or more processors and comprising program instructions configured to:
      execute a plurality of transactions operating in a transactional memory space within the memory, wherein the transactional memory space comprises a plurality of locations each associated with one of a plurality of ownership records;
   wherein the memory further comprises:
      a global conflict indication comprising a single value indicating whether a read-write conflict has occurred that affects any of the plurality of locations in the transactional memory space, wherein the global conflict indication is accessible by all of the plurality of transactions operating in the transactional memory space;
      means for semi-transparently reading the transactional memory space, wherein to support semi-transparently reading, the memory is configured to indicate in an ownership record associated with one or more locations in the transactional memory that one or more of the plurality of transactions are reading the one or more locations in the transactional memory space without specifically identifying the one or more transactions; and
      means for validating transactional reads of the transactional memory space, wherein to validate one or more transactional reads of a given transaction, the means for validating is configured to:
         determine whether the value of the global conflict indication indicates that a read-write conflict has occurred in the transactional memory space;
         attempt to validate the one or more transactional reads in response to determining that the value of the global conflict indication indicates that a read-write conflict has occurred in the transactional memory; and
         allow execution of the given transaction to continue without attempting to validate the one or more transactional reads in response to determining that the value of the global conflict indication indicates that a read-write conflict has not occurred in the transactional memory.

2. The system of claim 1, wherein the memory is further configured to indicate that the one or more transactions are reading the one or more locations associated with the ownership record by maintaining a transaction reading counter for the number of transactions reading the one or more locations in the ownership record.

3. The system of claim 2, wherein to execute transactions, the program instructions are further configured to execute a transaction identifying itself in the ownership record to acquire write ownership of the locations associated with the ownership record.

4. The system of claim 3, wherein to execute a transaction that acquires write ownership, the program instructions are further configured to implement:
   the transaction reading the transaction reading counter to determine if a read-write conflict will occur from the transaction writing to at least one of the locations associated with the ownership record; and,
   if it is determined that a read-write conflict will occur, the transaction updating the global conflict indication to indicate the read-write conflict.

5. The system of claim 4, wherein the program instructions are further configured to implement:
   the transaction executing said updating the global conflict indication only if the transaction reading counter indicates that other transactions have read at least one of the locations.

6. The system of claim 4,
   wherein in executing a transaction that has read at least one of the locations associated with the ownership record, the program instructions are further configured to implement:
      the transaction reading the global conflict indication to determine whether a read-write conflict has occurred;
   wherein if a read-write conflict has occurred, the program instructions are further configured to implement:
      the transaction determining whether the location previously read by the transaction has been modified; and
   wherein if a read-write conflict has not occurred, the previous read is valid; and
   wherein if the previous read is valid, the program instructions are configured to implement:
      the transaction continuing with execution.

7. The system of claim 1, wherein to validate transactional reads, the program instructions are further configured to implement:
   a transaction which has read one or more transactional memory space locations reading the global conflict indication to determine whether a read-write conflict has occurred.

8. The system of claim 7, wherein the memory further comprises means for determining whether the read-write conflict affected the locations read by the transaction.

9. The system of claim 7, wherein to determine whether the read-write conflict affected the locations, the program instructions are further configured to execute the transaction determining whether a transaction acquired write ownership for the locations since the transaction read the locations.

10. The system of claim 1, wherein, proximate to a first validation, the program instructions are further configured to execute a transaction recording the global conflict indication; and wherein, proximate to a subsequent validation, the program instructions are further configured to execute a transaction avoiding determining whether a conflict affected locations read by the transaction if the global conflict indication matches the recorded global conflict indication.

11. The system of claim 10, wherein the program instructions are further configured to execute the transaction recording the global conflict indication prior to beginning validation operations or during validation operations.

12. The system of claim 1, wherein the transactional memory space is implemented in a hardware transactional memory, a software transactional memory, or a hybrid transactional memory.

13. The system of claim 1, wherein the memory is further configured to employ at least one of transparent reading and non-transparent reading for a second transactional memory space within the memory.

14. A method, comprising:
  indicating whether a read-write conflict occurred in a transactional memory space comprising a plurality of locations each associated with one of a plurality of ownership records by maintaining a global conflict indication accessible by all of a plurality of transactions operating in the transactional memory space, wherein the global conflict indication comprises a single value indicating whether a read-write conflict has occurred that affects any of the plurality of locations in the transactional memory space; and
  validating transactional reads in accordance with the global conflict indication, wherein said validating comprises:
    for a given validation operation:
      one of the plurality of transactions reading the global conflict indication to determine whether a read-write conflict occurred;
      in response to determining that a read-write conflict has occurred, the transaction determining whether the read-write conflict affected any locations read by the transaction; and
      in response to determining that the read-write conflict did not affect any locations read by the transaction, allowing the transaction to continue execution.

15. The method of claim 14, further comprising, for another validation operation:
  one of the plurality of transactions reading the global conflict indication to determine whether a read-write conflict occurred; and
  in response to determining that the global conflict indication indicates that a read-write conflict has not occurred, the transaction continuing execution without determining whether the read-write conflict affected any locations read by the transaction.

16. The method of claim 14, further comprising a first of the plurality of transactions attempting to modify a set of one or more locations in the transactional memory space while refraining from aborting other ones of the plurality of transactions that have read the set of locations.

17. The method of claim 16, further comprising the first transaction updating the global conflict indication if other ones of the plurality of transactions have read the set of locations.

18. The method of claim 17, further comprising the other transactions aborting themselves if the modifications by the first transaction affect locations read by the other transactions.

19. The method of claim 16 further comprising:
  associating one of the plurality of ownership records with the set of locations,
  wherein the ownership record indicates a counter for the number of transactions that have read at least one of the set of locations, and
  wherein the ownership record indicates the first transaction as having write ownership on the set of locations.

20. The method of claim 19, further comprising:
  a transaction incrementing the counter prior to reading at least one of the set of locations; and
  the transaction decrementing the counter after validating.

21. The method of claim 19, further comprising the first transaction incrementing the counter to indicate the first transaction reading at least one of the set of locations and refrains from updating the global conflict indication if no other transactions have read at least one of the set of locations.

22. A method, comprising:
  a first transaction reading a global conflict indication to determine whether a read-write conflict has occurred in a transactional memory space, wherein the transactional memory space comprises a plurality of locations each associated with one of a plurality of ownership records, and wherein the global conflict indication comprises a single value indicating whether a read-write conflict has occurred that affects any of the plurality of locations in the transactional memory space;
  in response to determining that a read-write conflict has occurred, determining whether the read-write conflict corresponds to any locations read by the first transaction; and
  in response to determining that the read-write conflict did not correspond to any locations read by the first transaction, the first transaction continuing execution;
  wherein the global conflict indication is accessible by all of a plurality of transactions executing in the transactional memory space.

23. The method of claim 22, further comprising:
  a second transaction acquiring write ownership for a set of one or more locations in the transactional memory space;
  the second transaction determining whether any other transaction has read the set of locations; and
  updating the global conflict indication to indicate occurrence of a read-write conflict if any other transaction has read the set of locations.

24. The method of claim 23, further comprising the second transaction accessing at least one of the set of locations without aborting transactions that have read at least one of the set of locations.

25. The method of claim 24, further comprising:
  the other transactions determining whether a read-write conflict caused by the second transaction corresponds to transactional memory space locations read by the other transactions; and
  in response to one or more of the other transactions determining that a read-write conflict caused by the second transaction corresponds to transactional memory space locations read by the one or more of the other transactions, the one or more of the other transactions aborting themselves.

26. The method of claim 22, further comprising the first transaction continuing to execute if a read-write conflict has not occurred.

27. The method of claim 22, wherein the transactional memory space is implemented with hardware transactional memory, software transactional memory, or hybrid hardware/software transactional memory.

28. The method of claim 22, further comprising the first transaction incrementing a counter for the set of locations to indicate that the first transaction has read at least one of the set of locations prior to validating, but without the first transaction identifying itself.

29. The method of claim 28, further comprising the first transaction decrementing the counter subsequent to the first transaction being either validated or aborted.

30. The method of claim 22, wherein the first transaction determining whether the read-write conflict corresponds to locations read by the first transaction comprises:
  reading a write ownership identifier that indicates a transaction that currently possesses write ownership for the locations; and comparing the write ownership identifier with a previous recording of the write ownership identifier to determine if the write ownership identifier has changed.

31. An apparatus, comprising:
means for implementing a transactional memory comprising a plurality of storage locations each associated with one of a plurality of ownership records;
means for semi-transparently reading the transactional memory, wherein semi-transparently reading allows writing transactions to be aware of reading transactions by providing an indication in an ownership record associated with one or more locations in the transactional memory that one or more transactions are reading the one or more locations in the transactional memory;
means for determining a read-write conflict between a writing transaction and one or more reading transactions of which the writing transaction is aware; and
means for updating a global conflict indication in response to said determining;
wherein the global conflict indication is accessible by all of a plurality of transactions executing in the transactional memory, and wherein the global conflict indication comprises a single value indicating whether a read-write conflict has occurred that affects any of the plurality of locations in the transactional memory.

32. The apparatus of claim 31, further comprising means for validating transactional reads, wherein to validate one or more transactional reads of a given transaction, the means for validating is configured to:
determine whether the value of the global conflict indication indicates that a read-write conflict has occurred in the transactional memory;
attempt to validate the one or more transactional reads in response to determining that the value of the global conflict indication indicates that a read-write conflict has occurred in the transactional memory; and
allow execution of the given transaction to continue without attempting to validate the one or more transactional reads in response to determining that the value of the global conflict indication indicates that a read-write conflict has not occurred in the transactional memory.

33. The apparatus of claim 31, wherein semi-transparently reading allows writing transactions to be aware of reading transactions, without specifically identifying the reading transactions.

34. The apparatus of claim 31, wherein the means for implementing transactional memory comprises software transactional memory.

35. A computer-readable storage medium comprising: a first sequence of program instructions executable to implement:
writing at least one location in a set of one or more locations in a transactional memory space comprising a plurality of locations each associated with one of a plurality of ownership records;
accessing one of the plurality of ownership records to determine whether any other transactions have read the set of one or more locations, wherein the ownership record is associated with the set of locations; and
in response to said determining, indicating to all of a plurality of transactions operating in a transactional memory space whether a read-write conflict will occur that corresponds to the set of locations, wherein said indicating comprises updating a global conflict indication that is accessible by all of the plurality of transactions and that comprises a single value indicating whether a read-write conflict has occurred that affects any of the plurality of locations in the transactional memory.

36. The computer-readable storage medium of claim 35, wherein the ownership record includes a counter that indicates a number of transactions that have read at least one of the set of locations.

37. The computer-readable storage medium of claim 35, wherein the first sequence of program instructions is further executable to implement acquiring write ownership for a transaction for the set of locations.

38. The computer-readable storage medium of claim 37, wherein the acquiring write ownership comprises identifying the transaction.

39. The computer-readable storage medium of claim 37, wherein the acquiring write ownership comprises indicating a timestamp.

40. The computer-readable storage medium of claim 38, wherein identifying the transaction comprises identifying the transaction in the ownership record that is associated with the set of locations.

41. The computer-readable storage medium of claim 35, wherein the transactional memory space is implemented with hardware transactional memory, software transactional memory, or a hybrid of hardware and software transactional memory.

42. The computer-readable storage medium of claim 35, wherein the first sequence of program instructions comprises a synchronization construct configured to atomically update at least one of the global conflict indication and the ownership record associated with the set of locations.

43. The computer-readable storage medium of claim 42, wherein the synchronization construct comprises a compare-and-swap instruction, a load-linked/store conditional operation sequence, or a hardware transactional memory access.

44. A computer-readable storage medium comprising:
a first sequence of program instructions executable to implement semi-transparently reading a set of one or more locations in a transactional memory space comprising a plurality of locations each associated with one of a plurality of ownership records, wherein semi-transparently reading comprises indicating in an ownership record associated with the set of one or more locations that one or more transactions are reading the set of one or more locations without specifically identifying the transactions;
a second sequence of program instructions executable to implement validating a transactional read, wherein said validating comprises:
determining whether a value of a global conflict indication indicates that a read-write conflict has occurred in the transactional memory space, wherein the global conflict indication comprises a single value indicating whether a read-write conflict has occurred that affects any of the plurality of locations in the transactional memory space, and wherein the global conflict indication is accessible by all of a plurality of transactions operating in the transactional memory space; and
in response to determining that the value of the global conflict indication indicates that a read-write conflict has occurred that affects one or more of the plurality of locations in the transactional memory space, attempting to validate the transactional read.

45. The computer-readable storage medium of claim 44, wherein the semi-transparent reading comprises transactions indicating acquisition of read ownership for the set of one or more locations without specifically identifying themselves.

46. The computer-readable storage medium of claim 45, wherein the semi-transparent reading comprises the first sequence of program instructions executing incrementing a counter in the ownership record associated with the set of one or more locations prior to reading at least one of the set of one or more locations.

47. The computer-readable storage medium of claim 46 further comprising a third sequence of program instructions executable to implement decrementing the counter in response to a transaction that corresponds to the first sequence of program instructions being aborted or validated.

48. The computer-readable storage medium of claim 46, wherein the ownership record indicates the counter and indicates an identity of a transaction that has held or currently holds write ownership for the set of one or more locations.

49. The computer-readable storage medium of claim 44, wherein said attempting to validate comprises:

determining whether the read-write conflict corresponds to any locations read by a transaction that corresponds to the first sequence of program instructions.

50. The computer-readable storage medium of claim 44 further comprising a third sequence of program instructions executable to implement recording the global conflict indication.

51. The computer-readable storage medium of claim 50, wherein the second sequence of program instructions is further executable to implement:

comparing a previous recording of the global conflict indication with a current reading of the global conflict indication; and determining that a read-write conflict has occurred if there is a difference between the current reading of the global conflict indication and the previous recording of the global conflict indication.

* * * * *

UNITED STATES PATENT AND TRADEMARK OFFICE
CERTIFICATE OF CORRECTION

| | | |
|---|---|---|
| PATENT NO. | : 7,711,909 B1 | Page 1 of 1 |
| APPLICATION NO. | : 11/008692 | |
| DATED | : May 4, 2010 | |
| INVENTOR(S) | : Yosef Lev et al. | |

It is certified that error appears in the above-identified patent and that said Letters Patent is hereby corrected as shown below:

Title Page; item (56);
On page 2, in column 2, under "Other Publications", line 43, after "Language" delete "and".

In column 6, line 39, delete "<Transactoin" and insert -- <Transaction --, therefor.

Signed and Sealed this
Twelfth Day of April, 2011

David J. Kappos
*Director of the United States Patent and Trademark Office*